United States Patent
Ramirez Angulo et al.

(10) Patent No.: US 11,168,240 B2
(45) Date of Patent: *Nov. 9, 2021

(54) HYDROBICALLY TREATED PARTICULATES FOR IMPROVED RETURN PERMEABILITY

(71) Applicant: Halliburton Energy Services, Inc., Houston, TX (US)

(72) Inventors: Jessica Paola Ramirez Angulo, Kingwood, TX (US); William Walter Shumway, Spring, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 69 days.

This patent is subject to a terminal disclaimer.

(21) Appl. No.: 16/492,454

(22) PCT Filed: Apr. 21, 2017

(86) PCT No.: PCT/US2017/028902
§ 371 (c)(1),
(2) Date: Sep. 9, 2019

(87) PCT Pub. No.: WO2018/194670
PCT Pub. Date: Oct. 25, 2018

(65) Prior Publication Data
US 2021/0017439 A1    Jan. 21, 2021

(51) Int. Cl.
*E21B 21/00*    (2006.01)
*C09K 8/03*    (2006.01)
(Continued)

(52) U.S. Cl.
CPC .............. *C09K 8/032* (2013.01); *C09K 8/506* (2013.01); *C09K 8/5045* (2013.01); *C09K 8/516* (2013.01); *E21B 21/003* (2013.01)

(58) Field of Classification Search
None
See application file for complete search history.

(56) References Cited

U.S. PATENT DOCUMENTS

| 6,737,384 | B2 | 5/2004 | Raybom |
| 7,261,156 | B2 | 8/2007 | Nguyen et al. |

(Continued)

FOREIGN PATENT DOCUMENTS

| EA | 12514 | 10/2009 |
| RU | 2249089 | 3/2005 |

(Continued)

OTHER PUBLICATIONS

ISRWO International Search Report and Written Opinion for PCT/US2017/028902 dated Nov. 27, 2017.
(Continued)

*Primary Examiner* — Andrew Sue-Ako
(74) *Attorney, Agent, or Firm* — Tenley Krueger; C. Tumey Law Group PLLC

(57) ABSTRACT

Compositions, methods, and systems for using particulates treated with one or more hydrophobizing agents in forming filter cakes during drilling to improve filter-cake removal. A method for drilling a wellbore may include circulating a drilling fluid in the wellbore, wherein the drilling fluid comprises particulates treated with one or more hydrophobizing agents; extending the wellbore while the drilling fluid is circulated in the wellbore; and forming a filter cake in the wellbore, wherein the filter cake comprises a portion of the particulates from the drilling fluid.

17 Claims, 1 Drawing Sheet

(51) Int. Cl.
*C09K 8/504* (2006.01)
*C09K 8/506* (2006.01)
*C09K 8/516* (2006.01)

(56) References Cited

U.S. PATENT DOCUMENTS

| | | | |
|---|---|---|---|
| 7,350,571 B2 | 4/2008 | Nguyen et al. | |
| 2004/0094300 A1 | 5/2004 | Sullivan et al. | |
| 2006/0229212 A1* | 10/2006 | Willberg | C09K 8/5045 |
| | | | 507/219 |
| 2007/0078064 A1 | 4/2007 | Munoz, Jr. et al. | |
| 2007/0079965 A1 | 4/2007 | Nguyen et al. | |
| 2008/0017382 A1* | 1/2008 | Harris | C09K 8/52 |
| | | | 166/307 |
| 2008/0169103 A1* | 7/2008 | Carbajal | C09K 8/52 |
| | | | 166/300 |
| 2008/0269079 A1 | 10/2008 | Ballard | |
| 2011/0056683 A1 | 3/2011 | Duncum et al. | |
| 2013/0213638 A1* | 8/2013 | Keller | C09K 8/467 |
| | | | 166/248 |
| 2014/0135237 A1 | 5/2014 | Villarreal, Jr. et al. | |
| 2014/0190700 A1 | 7/2014 | Tang et al. | |
| 2015/0197998 A1* | 7/2015 | Kapila | E21B 21/062 |
| | | | 166/244.1 |
| 2016/0362594 A1 | 12/2016 | Rojas et al. | |
| 2018/0305603 A1* | 10/2018 | Shumway | E21B 37/00 |
| 2018/0320049 A1* | 11/2018 | Shumway | E21B 21/062 |

FOREIGN PATENT DOCUMENTS

| | | |
|---|---|---|
| WO | 2009006731 | 1/2009 |
| WO | 2014133537 | 9/2014 |
| WO | 2015130276 | 9/2015 |
| WO | 2017116438 | 7/2017 |
| WO | 2017116440 | 7/2017 |

OTHER PUBLICATIONS

Russian Office Action and Search Report with Translations for Application No. 2019128879 dated Mar. 11, 2020.

* cited by examiner

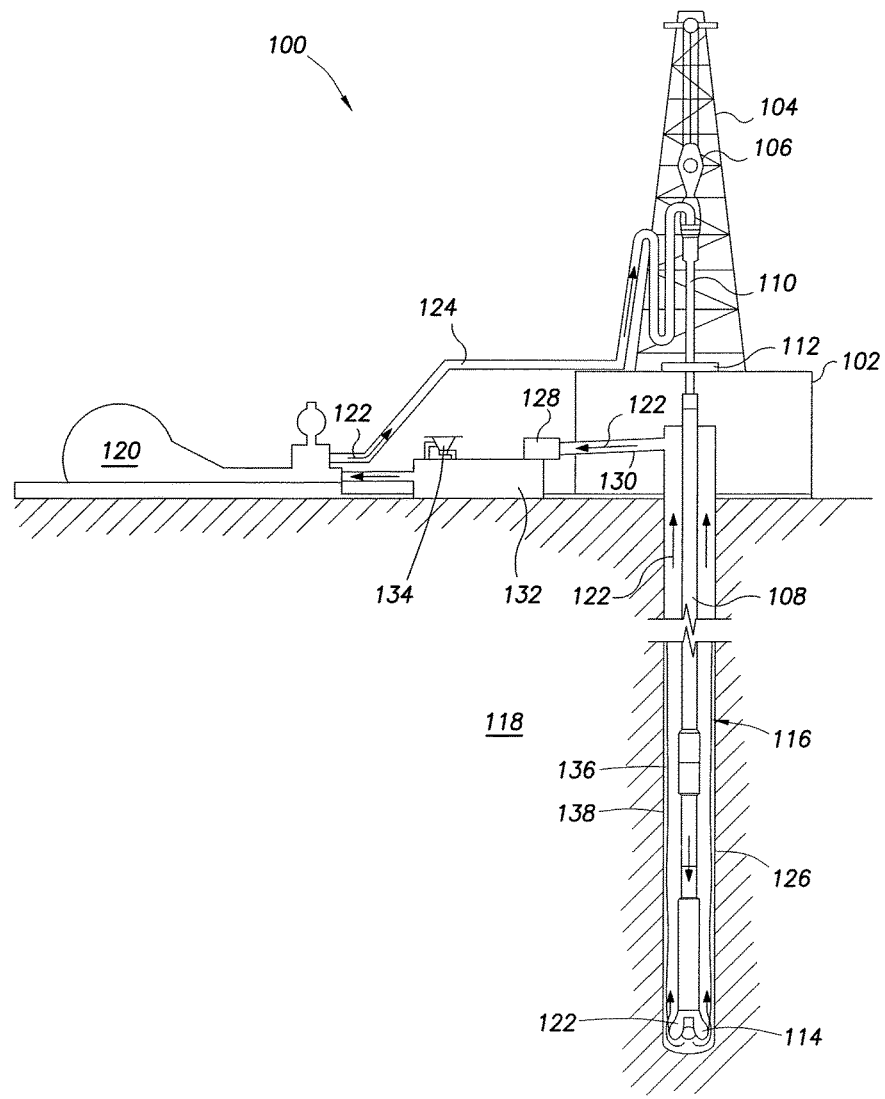

HYDROBICALLY TREATED PARTICULATES FOR IMPROVED RETURN PERMEABILITY

BACKGROUND

During the drilling of a wellbore into a subterranean formation, a drilling fluid, also referred to as a drilling mud, may be circulated from the surface down to the bottom of the wellbore being drilled and back to the surface again. Among other functions, the drilling fluid may serve to transport wellbore cuttings up to the surface, cool the drill bit, and provide hydrostatic pressure on the walls of the drilled wellbore. When wellbores are drilled into producing formations, drilling fluids are utilized which will minimize damage to the permeability of the formations and their ability to produce hydrocarbons. Drilling fluids designed for drilling through subsurface reservoirs are commonly referred to as "drill-in fluids." As used herein, the term "reservoir" refers to portions of a subsurface formation or formations that contain accumulations of hydrocarbons (e.g., oil and/or gas). As compared to conventional drilling fluids, drill-in fluids are designed to minimize damage and maximize production from reservoirs.

The drilling fluids may deposit a layer of particles known as a "filter cake" on the walls of the wellbore. As used herein, the term "filter cake" refers to the residue deposited on a permeable medium when a solids-containing fluid is forced against the permeable medium under pressure. In drilling, the drilling fluid is the solids-containing fluid and deposits the filter cake on the wellbore walls as it is circulated in the wellbore. The filter cake may prevent the drilling fluids (or other servicing fluids) from being lost into the formations and also may prevent solids from entering the porosities of the producing formations. The filter cake reduces operational costs by reducing the loss of fluids into the formation and hindering solids from entering the porosities of the formation. Following completion and prior to initiating production, the filter cake is typically removed. Conventionally, filter cakes may be removed by contacting the filter cake with a breaker, which may include one or more acids, acid precursors (esters), oxidizers, and/or enzymes, to facilitate degradation of particulates in the filter cake. Despite advances in the state of the art, filter cake removal remains a problem in the industry.

BRIEF DESCRIPTION OF THE DRAWINGS

These drawings illustrate certain aspects of some examples of the present invention, and should not be used to limit or define the invention.

The FIGURE is a schematic diagram of an example drilling assembly.

DETAILED DESCRIPTION

Provided are compositions, methods, and systems for drilling wells in subterranean formations. More particularly, the present disclosure relates to compositions, methods, and systems for using particulates treated with one or more hydrophobizing agents in forming filter cakes during drilling to improve filter-cake removal.

The present disclosure provides compositions, methods, and systems that include particulates treated with one or more hydrophobizing agents in drilling fluids. For example, the particulates may be at least partially coated with one or more hydrophobizing agents. The particulates treated with one or more hydrophobizing agents will be referred to herein as "treated particulates." Methods may include circulating a drilling fluid including the treated particulates in a wellbore while drilling. The methods may further include forming a filter cake including the treated particulates. The filter cake may include residue from the drilling fluid on the wellbore walls as portions of the drilling fluid are forced into the subterranean formation surrounding the wellbore due to differential pressure between hydrostatic pressure and formation pressure.

Among the many potential advantages to the compositions, methods, and systems of the present disclosure, only some of which are alluded to herein, is that the treated particulates may function to improve filter cake removal. Inadequate filter cake removal can damage the formation and impair future production as residue from the drilling fluid remaining in formation permeability and/or wellbore walls can negatively impact formation permeability. As compared to non-treated particulates, filter cakes containing the treated particulates may be more easily removed, thus minimizing formation damage caused by the filter cake. In addition, filter cake cleanup typically may include contacting the filter cake with a breaker to facilitate filter cake degradation. However, use of the breaker adds additional costs and delay to the drilling operation. Filter cakes that include the treated particulates may be removed without the need for a breaker, thus reducing costs and delays that are typically associated with filter cake removal, while also minimizing potential problems associated with breakers, such as corrosion and formation damage, among others. Even further, by improving filter cake removal, drilling fluids formulated with less expensive brines that typically may not be used when drilling through reservoirs due to their propensity for formation damage may now be used for drilling through reservoirs as the treated particulates may enable adequate filter cake removal to minimize formation damage.

The particulates treated with the one or more hydrophobizing agents may include any of a variety of particulates suitable for use in subterranean applications, particularly in drilling applications. The particulates may include bridging agents that form part of the filter cake formed on wellbore walls during the drilling operations. Suitable particulates may include, but is not limited to, inorganic particulates. Suitable particulates may include, but are not limited to, calcium carbonate, magnesium carbonate, magnesium oxide, magnesium citrate, bismuth citrate, zinc carbonate, zinc oxide, zinc carbonate, calcium sulfate, calcium citrate, calcium succinate, calcium tartrate, calcium maleate silica, bismuth citrate, crystalline silica, iron carbonate, polylactic acid, and combinations thereof. It is to be understood that term "particulate" as used herein is intended to include solid materials of any suitable shape, including substantially spherical materials, fibrous materials, polygonal materials, irregularly shaped materials, and mixtures thereof, among others. The particulates may have any suitable size depending on the particular application, as should be appreciated by those of ordinary skill in the art. Generally, the particle size of the particulates may be selected based on a number of factors, including, but not limited to, the pore throat size of the formation in which the particulates are to be used. Suitable particulates may have a mean particle size in a point within a range from about 1 micron to about 2,000 microns, alternatively from about 1 micron to about 200 microns. Blends of particulates with different mean particle sizes may also be used. As used herein, the mean particle size of the particulates is determined by laser diffraction with a Malvern Mastersizer™ 3000 laser diffraction particle size analyzer.

The one or more hydrophobizing agents may include any compound capable of rendering the surface of the particulates hydrophobic. The surface of the particulate is hydrophobic if the particulates have a contact angle of greater than 90 degrees after treatment with the one or more hydrophobizing agents. For purposes of this disclosure, contact angles are evaluated on flat surfaces using classical liquid contact angle measurements. In practice, the discs are prepared by compression under controlled conditions: 5000 mg of coated GCC powder and a pressure of 20 Tons, in a typical IR die. The contact angle measurements were carried out using a Keyence Digital Microscope within 10 seconds after placing a drop of liquid on GCC disc. The hydrophobizing agents may accomplish the hydrophobic surface by adsorbing onto, binding to, or reacting with the hydrophilic surface of the particulates. Suitable hydrophobizing may include, but are not limited to, polymers having one or more pendant acid moieties, fatty acids (e.g., stearic acid, oleic acid, lauric acid, caproic acid), organic acids, organosilanes, silicone, hydrophobic silicas, silanes, titania, zirconia, gold, thiols, nanomaterials (e.g., nano-scale materials including alumina, hydrophobic silica, gold, silver, copper, or other transition metals), functionalized carbon-based nano-materials (e.g., graphene-oxide, COOH-terminated carbon nanotubes, and graphenes), carbohydrates, proteins, lipids, nucleic acids, alumina, and any combination thereof. As herein, the term "nano-scale" refers to structures with a length, width or height of 100 nanometers or less. As used herein, the term "fatty acid" refers to carboxylic acids. Suitable fatty acids may have a carbon backbone chain of any suitable length, which may be saturated or unsaturated. The carbons chains in the fatty acids may include, but are not limited to, alkyl groups, alkene groups, alkyne groups, or a combination thereof, each of which may be branched, unbranched, or cyclic. Suitable fatty acids may include a carbon backbone chain that includes 10 or more carbon atoms, for example, a carbon backbone chain that ranges from 10 carbon atoms to 30 carbon atoms, from 12 carbon atoms to 18 carbon atoms, or from 16 carbon atoms to 18 carbon atoms.

Any of a variety of suitable techniques may be used to treat the particulates with the one or more hydrophobizing agents such that hydrophobizing agent, for example, may adsorb onto, bind to, or react with the hydrophilic surface of the particulates to render the surface hydrophobic. A suitable technique may include, but is not limited to, depositing the hydrophobizing agents on the surface of the particulate using any of a variety of techniques, including a sol-gel process, precipitation, spray drying, liquid coating following by evaporation, and spin coating, among others. The one or more hydrophobizing agents may be deposited onto a surface of the particulate to at least partially (or entirely) coat the surface of the particulate. For example, the hydrophobizing agents may coat at least 50%, at least 75%, at least 90%, at least 95%, at least 99%, or more of the external surface area of particulate. Certain hydrophobizing agents may form at least a partial monolayer on the surface to which they are applied. One or ordinary skill in the art, with the benefit of this disclosure, should be able to selected an appropriate technique for treatment of the particulates with the one or more hydrophobizing agents.

The treated particulates may be included in the drilling fluids in any suitable amount for a particular application. Suitable amounts of the treated particulates in the drilling fluids may include, but are not limited to, an amount ranging from about 0.5 pounds (0.2 kilograms) to 120 pounds (54 kilograms) per barrel (159 liters) of the drilling fluid, from about 3 pounds (1.4 kilograms) to about 40 pounds (18 kilograms) per barrel (liters) of the drilling fluid, or from about 10 pounds (4.5 grams) to about 40 pounds (18 kilograms) per barrel (liters) of the drilling fluids. Suitable amounts of the treated particulates may include an amount ranging between any of and/or including any of about 0.5 pounds (0.2 kilograms), 5 pounds (2 kilograms), 10 pounds (5 kilograms), 20 pounds (9 kilograms), 30 pounds (14 kilograms), 40 pounds (18 kilograms), 50 pounds (23 kilograms), 60 pounds (27 kilo grams), 80 pounds (36 kilograms), 100 pounds (45 kilograms), or 120 pounds (54 kilograms) per barrel (159 liters).

The treated particulates may be included in any suitable type of drilling fluid as will be appreciated by those of ordinary skill in the art, with the benefit of this disclosure. Suitable drilling fluids may include, but are not limited to, aqueous-based drilling fluids, oil-based drilling fluids, and synthetic-based drilling fluids.

Where used, the water may be included in the drilling fluid from any suitable source. By way of example, the water may be sourced from freshwater, saltwater, and produced water, among others. Water may be used, for example, as the base fluid in an aqueous-based fluid or the discontinuous phase in oil-based or synthetic-based drilling fluids in the form of invert emulsions. The water may be included in the drilling fluid in any suitable amount for a particular application as desired by one of ordinary skill in the art. Where present, the water may be included in a point up to about 98% by volume of the drilling fluid. Suitable amounts of water may include an amount ranging between any of and/or including any of about 10%, about 20%, about 30%, about 40%, about 50%, about 60%, about 70%, about 80%, about 90%, about 95%, or about 98% by volume.

One or more dissolved salts may also be present in the drilling fluids. Where used, the dissolved salt may be included in the drilling fluid for many purposes, including, but not limited to, densifying a drilling fluid including water to a chosen density. A mixture of one or more dissolved salts and water may be used in some instances. The amount of salt that should be added may be the amount needed to provide a desired density. In some embodiments, one or more salts may be added to the water to provide a brine that includes the dissolved salt and the water. As used herein, the term "brine" refers to water that includes a dissolved salt (or mixture of dissolved salts) in an amount of about 5 wt. % or greater by weight of the water. Suitable dissolved salts may include monovalent and divalent salts, which may be used, for example, to form monovalent or divalent brines. Mixtures of monovalent and divalent salts may also be used. Suitable monovalent salts may include, but are not limited to, sodium chloride, sodium bromide, potassium bromide, potassium chloride, lithium chloride, sodium formate potassium formate, cesium formate, and mixtures thereof among others. Suitable divalent salts may include, but are not limited to, calcium bromide, zinc bromide, calcium chloride, manganese bromide, manganese chloride, zinc chloride and mixtures thereof. Divalent salts may be undesirable in some instances despite the reduced costs of some divalent salts, such as calcium chloride, due to their tendency to be more damaging to the formation, as filter cakes formed with them may be more difficult to remove than those formed with other salts, such as sodium bromide. However, by use of the treated particulates disclosed herein improved filter cake removal may be provided even for drilling fluids that include divalent salts, enabling use of divalent salts in a broader range of applications.

Weighting agents may also be included in the drilling fluids. The term weighting agents refers to particulate materials present in the drilling fluid that weigh more than water and may be used to increase the density of drilling fluids. By way of example, weighting agents may have a specific gravity of about 2 or higher (e.g., about 2, about 4, etc.). Suitable weighting agents may include, but are not limited to, calcium carbonate, magnesium carbonate, iron carbonate, hematite, ilmenite, hausmannite, barite, manganese tetraoxide, and combinations thereof.

Optional additives may be included in the drilling fluids as desired for a particular application. Suitable optional additives may include, but are not limited to, surfactants, acids, additional particulates, diverting agents, fluid loss control additives, gas (e.g., nitrogen, carbon dioxide), tackifying agents, foamers, corrosion inhibitors, scale inhibitors, catalysts, clay control agents, biocides, friction reducers, antifoam agents, flocculants, $H_2S$ scavengers, $CO_2$ scavengers, oxygen scavengers, lubricants, viscosifiers, breakers, resins, wetting agents, and combinations thereof. Those of ordinary skill in the art, with the benefit of this disclosure, should recognize the type and amount of additive to include in the drilling fluids for a particular application.

The drilling fluid in which the treated particulates are included may have any suitable density for a particular application. Suitable densities may include, but are not limited to, a density ranging from about 8 pounds per gallon (1 kg/L) to about 20 pounds per gallon (2.4 kg/L) or from about 12 pounds per gallon (1.4 kg/L) to about 20 pounds per gallon (2.4 kg/L). Those of ordinary skill in the art, with the benefit of this disclosure, should to select a density of the drilling fluid for a particular application.

The drilling fluids may be prepared using any suitable method and/or equipment (e.g., blenders, mixers, stirrers, etc.). The drilling fluids may be prepared at least in part at a well site, at an offsite location, or a combination thereof. In certain embodiments, the treated particulates may be metered directly into a base fluid (e.g., a base fluid including water, such as a brine) to form the drilling fluid. In certain embodiments, the treated particulates and/or other drilling fluid components may be mixed with the base fluid at a well site where the drilling operation is conducted, either by batch or continuous mixing. In certain embodiments, the drilling fluids may be prepared, either in whole or part, at an offsite location and transported to the site where the drilling operation is to be conducted.

The drilling fluids that include the treated particulates may be employed in drilling operations. The drilling operations may be conducted in drilling vertical or non-vertical wellbores. By way of example, the drilling fluid may be prepared (or otherwise provided) and circulated through the wellbore as the wellbore is being drilled to facilitate the drilling operation. The drilling fluid may be a drill-in fluid (or other suitable fluid) for drilling through a reservoir. A filter cake may be formed in the wellbore that includes a portion of the treated particulates from the drilling fluid. It should be understood that additional treated particulates are removed from the wellbore with the drilling fluid. In conventional drilling operations, breakers may be used for removal of the filter cake. However, as described above, while they may be used, breakers may not be needed for removal of the filter cake including the treated particulates. Instead, the filter cake may be at least partially removed up by flowing back the well, wherein flow of formation fluids may be relied on to remove the filter cake instead of breakers. For example, the wellbore may be flowed back to at least partially remove the filter cake, wherein the at least partial removal of the filter cake occurs in the absence of contact with the breaker. It should be understood that references to filter cake removal is not intended to imply complete removal of the entire filter cake as some portions of the filter cake may remain, but that the filter cake is at least partially removed such that permeability is returned to the formation for production. For ease of removal, it may be desired for the filter cake to have a reduced liftoff pressure, which is generally the differential pressure required for flow breakthrough, either physical liftoff of the filter cake or by channeling through the filter cake, for example. As illustrated in the examples below, filter cakes that include the treated particulates may exhibit reduced liftoff pressures as compared to filter cakes that include untreated particulates. Accordingly, remove of filter cakes may be enhanced by inclusion of treated particulates in the filter cakes.

FIG. 1 illustrates an example drilling assembly 100 in which a drilling fluid 122 as disclosed above (e.g., a drilling fluid including treated particulates) may be used. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

As illustrated, the drilling assembly 100 may include a drilling platform 102 that supports a derrick 104 having a traveling block 106 for raising and lowering a drill string 108. The drill string 108 may include, but is not limited to, drill pipe and coiled tubing, as generally known to those skilled in the art. A kelly 110 may support the drill string 108 as it is lowered through a rotary table 112. A drill bit 114 may be attached to the distal end of the drill string 108 and may be driven either by a downhole motor and/or via rotation of the drill string 108 from the well surface. The drill bit 114 may include, but is not limited to, roller cone bits, PDC bits, natural diamond bits, any hole openers, reamers, coring bits, etc. As the drill bit 114 rotates, it may create and extend a wellbore 116 that penetrates various subterranean formations 118.

Drilling fluid 122 treated particulates may be prepared. A pump 120 (e.g., a mud pump) may circulate drilling fluid 122 through a feed pipe 124 and to the kelly 110, which conveys the drilling fluid 122 downhole through the interior of the drill string 108 and through one or more orifices in the drill bit 114. As illustrated, the drilling fluid 122 may form a filter cake 136 on inner walls 138 of wellbore 116. The filter cake 136 may include portions of the treated particulates from the drilling fluid 122. The drilling fluid 122 may be circulated back to the surface via an annulus 126 defined between the drill string 108 and the walls of the wellbore 116. At the surface, the recirculated or spent drilling fluid 122 may exit the annulus 126 and may be conveyed to one or more fluid processing unit(s) 128 via an interconnecting flow line 130. The fluid processing unit(s) 128 may include, but is not limited to, one or more of a shaker (e.g., shale shaker), a centrifuge, a hydrocyclone, a separator (including magnetic and electrical separators), a desilter, a desander, a separator, a filter (e.g., diatomaceous earth filters), a heat exchanger, and/or any fluid reclamation equipment. The fluid processing unit(s) 128 may further include one or more sensors, gauges, pumps, compressors, and the like used store, monitor, regulate, and/or recondition the drilling fluid.

After passing through the fluid processing unit(s) 128, a "cleaned" drilling fluid 122 may be deposited into a nearby retention pit 132 (i.e., a mud pit). While illustrated as being arranged at the outlet of the wellbore 116 via the annulus 126, those skilled in the art will readily appreciate that the fluid processing unit(s) 128 may be arranged at any other location in the drilling assembly 100 to facilitate its proper function, without departing from the scope of the scope of the disclosure. One or more of the drilling fluid additives may be added to the drilling fluid 122 via a mixing hopper 134 communicably coupled to or otherwise in fluid communication with the retention pit 132. The mixing hopper 134 may include, but is not limited to, mixers and related mixing equipment known to those skilled in the art. Alternatively, the drilling fluid additives may be added to the drilling fluid 122 at any other location in the drilling assembly 100. While FIG. 1 shows only a single retention pit 132, there could be more than one retention pit 132, such as multiple retention pits 132 in series. Moreover, the retention put 132 may be representative of one or more fluid storage facilities and/or units where the drilling fluid additives may be stored, reconditioned, and/or regulated until added to the drilling fluid 122.

The exemplary drilling fluids disclosed herein may directly or indirectly affect one or more components or pieces of equipment associated with the preparation, delivery, recapture, recycling, reuse, and/or disposal of the disclosed drilling fluids. For example, the disclosed drilling fluids may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary drilling fluids. The disclosed drilling fluids may also directly or indirectly affect any transport or delivery equipment used to convey the drilling fluids to a well site or downhole such as, for example, any transport vessels, conduits, pipelines, trucks, tubulars, and/or pipes used to compositionally move the drilling fluids from one location to another, any pumps, compressors, or motors (e.g., topside or downhole) used to drive the drilling fluids into motion, any valves or related joints used to regulate the pressure or flow rate of the drilling fluids, and any sensors (i.e., pressure and temperature), gauges, and/or combinations thereof, and the like. The disclosed drilling fluids may also directly or indirectly affect the various downhole equipment and tools that may come into contact with the drilling fluids such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The compositions, systems and methods may include any of the various features of the compositions, systems, and methods disclosed herein, including one or more of the following statements.

Statement 1: A method for drilling a wellbore: circulating a drilling fluid in the wellbore, wherein the drilling fluid includes particulates treated with one or more hydrophobizing agents; extending the wellbore while the drilling fluid is circulated in the wellbore; and forming a filter cake in the wellbore, wherein the filter cake includes a portion of the particulates from the drilling fluid.

Statement 2: The method of statement 1, further including flowing back the wellbore to at least partially remove the filter cake, wherein the at least partial removal of the filter cake occurs in the absence of contact with one or more breakers.

Statement 3: The method of statement 1 or statement 2, wherein the extending the wellbore includes extending the wellbore into a reservoir.

Statement 4: The method of any preceding statement, wherein the particulates include an inorganic particulate.

Statement 5: The method of any preceding statement, wherein the particulates include at least one particulate selected from the group consisting of calcium carbonate, magnesium carbonate, magnetic oxide, magnesium citrate, zinc carbonate, zinc oxide, zinc carbonate, calcium sulfate, calcium citrate, calcium succinate, calcium tartrate, calcium maleate silica, bismuth citrate, crystalline silica, and combinations thereof.

Statement 6: The method of any preceding statement, wherein the particulates have a particle size in a point within a range of from about 1 micron to about 2,000 microns, and wherein the particulates are included in the drilling fluid in an amount of about 0.5 pounds to about 120 pounds per barrel of the drilling fluid.

Statement 7: The method of any preceding statement, wherein each of the particulates is at least partially coated with the one or more hydrophobizing agents.

Statement 8: The method of statement 7, wherein the one or more hydrophobizing agents coat at least 50% of an external surface area of one or more of the particulates.

Statement 9: The method of any preceding statement, wherein at least one of the one or more hydrophobizing agents includes a fatty acid.

Statement 10: The method of statement 9, wherein the fatty acid includes a carbon backbone chain that includes 10 or more carbon atoms.

Statement 11: The method of any preceding statement, wherein at least one of the particulates includes calcium carbonate, and wherein the one or more hydrophobizing agents include stearic acid.

Statement 12: The method of any preceding statement, wherein the drilling fluid further includes water.

Statement 13: The method of any preceding statement, wherein the drilling fluid further includes a brine including a dissolved divalent salt.

Statement 14: A method for drilling a wellbore including: circulating a drilling fluid in the wellbore, wherein the drilling fluid includes a brine and carbonate particulates coated with one or more fatty acids; extending the wellbore while the drilling fluid is circulated in the wellbore; and forming a filter cake in the wellbore, wherein the filter cake includes a portion of the carbonate particulates from the drilling fluid.

Statement 15: The method of statement 14, further including flowing back the wellbore to at least partially remove the filter cake, wherein the at least partial removal of the filter cake occurs in the absence of contact with one or more breakers.

Statement 16: The method of statement 14 or statement 15, wherein the extending the wellbore includes extending the wellbore into a reservoir.

Statement 17: The method of any one of statements 14 to 16, wherein the carbonate particulates have a particle size in a point within a range from about 1 micron to about 2,000 microns, and wherein the carbonate particulates are included in the drilling fluid in an amount of about 0.5 pounds to about 120 pounds per barrel of the drilling fluid.

Statement 18: The method of any one of statements 14 to 17, wherein the one or more hydrophobizing agents coat at least 50% of an external surface area of one or more of the carbonate particulates, wherein the one or more fatty acids includes a carbon backbone chain that includes 10 or more carbon atoms, wherein the carbonate particulates include calcium carbonate, and wherein the brine includes a dissolved divalent salt.

Statement 19: A method for drilling a wellbore: circulating a drilling fluid in the wellbore, wherein the drilling fluid includes a divalent brine and calcium carbonate coated with stearic acid; extending the wellbore into a reservoir while the drilling fluid is circulated in the wellbore; forming a filter cake in the wellbore, wherein the filter cake includes a portion of the calcium carbonate from the drilling fluid; and flowing back the wellbore to at least partially remove the filter cake, wherein the at least partial removal of the filter cake occurs in the absence of contact with one or more breakers.

Statement 20: The method of statement 19, wherein the calcium carbonate has a particle size in a point within a range from about 1 micron to about 2,000 microns, and wherein the calcium carbonate is included in the drilling fluid in an amount of about 0.5 pounds to about 120 pounds per barrel of the drilling fluid.

EXAMPLES

To facilitate a better understanding of the disclosure, the following examples of certain aspects of some embodiments are given. In no way should the following examples be read to limit, or define, the entire scope of the embodiments.

Example 1

A particulate bridging agent coated with stearic acid was prepared according to the following procedure. The particulate bridging agent was a sized, ground calcium carbonate bridging agent. Stearic acid at a concentration of 1 wt. % based upon total weight of the bridging agent was dissolved in an acetone solution at a rate of 250 milliliters of acetone for each 1 gram of stearic acid. The bridging agent was mixed into the acetone solution and stirred at 600 rpm with a benchtop paddle mixture. The acetone was then allowed to evaporate, and the coated particles were placed in a drying oven at 150° F. (93° C.).

Example 2

The following tests were performed to evaluate the return permeability for sample drilling fluids including the particulate bridging agent coated with stearic acid when no breaker was used. The particulate bridging agent coated with stearic acid was prepared according to the procedure described in Example 1 and included in the following sample drilling fluid.

TABLE 1

Sample Reservoir Drilling Fluid 1

| Formulation and Order of Addition | Value |
|---|---|
| 14.2 lb/gal CaBr$_2$, bbl | 0.837 |
| Water, bbl | 0.109 |
| Defoamer, % vol | 0.06 |
| Viscosifier/Filtration Control Additive, lb | 10.0 |
| pH buffer, lb | 1.0 |
| Calcium Carbonate (d50 of 5 microns), lb | 32.0 |
| Calcium Carbonate (d50 of 25 microns), lb | 8.0 |

Return permeability tests using a test core were conducted as follows. Bearea sandstone core plugs were cut, dried, and soaked overnight in a high temperature, reservoir drilling fluid. The sandstone core plugs had an air permeability of approximately 100 millidarcies. The core plug was then mounted in a permeameter (Model 6100 Formation Response Tester) and sealed with different confining pressure values. The temperature was increased to testing conditions while maintaining the confining pressure. A refined mineral oil (Soltrol 170® isoparaffin solvent) was then flowed through the core plug at different rates in a first (or production) direction until a stable permeability was measured. This permeability was recorded as the initial permeability. To simulate fluid and filtrate invasion into the core plug, the core plug was then exposed to sample drilling fluid 1 in a static mode. Specifically, sample drilling fluid 1 was placed against the outflow side of the core and differential pressure was applied in the direction opposite that of the previous flow measurement. The core plug was exposed to sample drilling fluid for different time testing periods at different temperature testing conditions. After this step, mineral flow was again flowed through the core at different rates in the first (or production) direction until a stable permeability was measured. The differential pressure for the mineral oil was increased until breakthrough of the filter cake formed by sample drilling fluid 1 occurred and flow of the mineral oil began. The pressure at the breakthrough was recorded as the liftoff pressure. This permeability was recorded as the final permeability.

The conditions used in the return permeability tests are summarized in the table below:

TABLE 2

Test Conditions

| Core | Bear Sandstone (~100 mD air permeability) |
|---|---|
| Temperature | 275° F. (135° C.) |
| Drilling Fluid Exposure Pressure | 500 psi (3447 kpa) |
| Drilling Fluid Exposure Time | 16 hours |
| Drilling Fluid Exposure Mode | Static |
| Permeability Flow Rate | 3.0 mL/min |

The sample drilling fluid used in this test was a 13.7 pound per gallon calcium bromide brine as set forth in Table 1 above. The results of return permeability tests for sample drilling fluid 1 including the particulate bridging agent coated with stearic acid or non-coated particulate bridging agent are provided in the table below:

TABLE 3

Return Permeability Tests

| Test # | Particulate Bridging Agent | Initial K | Final K | % Return | Liftoff Pressure |
|---|---|---|---|---|---|
| 1 | Non-Coated | 49.0 mD | 19.2 mD | 39% | 386 psi (2661 kPa) |
| 2 | Coated | 54.5 mD | 30.0 mD | 55% | 366 psi (2523 kPa) |

As illustrated in Table 3, the return permeability was better when using the particulate bridging agent coated with stearic acid. In addition, the liftoff pressure was slightly lower with the particulate bridging agent coated with stearic acid.

Example 3

Similar return permeability tests were conducted using the coated and non-coated particulate bridging agent in a sample drilling fluid formulated as a drill-in fluid. The particulate bridging agent coated with stearic acid was prepared according to the procedure described in Example 1 and included in the following sample drilling fluid.

TABLE 4

Sample Reservoir Drilling Fluid 2

| Formulation and Order of Addition | Value |
|---|---|
| *13.9 lb/gal 10° F., bbl | 0.932 |
| Defoamer, lb | 0.05 |
| Filtration Control Additive, lb | 6.0 |
| Viscosifier 1, lb | 0.5 |
| Ph Buffer, lb | 6.0 |
| Calcium Carbonate (d50 of 5 microns), lb | 35.0 |
| Calcium Carbonate (d50 of 25 microns), lb | 10.0 |
| Viscosifier 2, lb | 1.0 |
| Oxygen Scavenger, lb | 0.2 |

*13.9 lb/gal CaBr2/CaCl2 was prepared as follows: 0.1464 bbl 11.6 lb/gal CaCl2 + 0.8408 bbl 14.2 lb/gal CaBr2 and 11 lb CaCl2 powder The conditions used in the return permeability tests are summarized in the table below:

TABLE 5

Test Conditions

| Core | Bear Sandstone (~100 mD air permeability) |
|---|---|
| Temperature | 240° F. (116° C.) |
| Drilling Fluid Exposure Pressure | 800 psi (5516 kpa) |
| Drilling Fluid Exposure Time | 16 hours |
| Drilling Fluid Exposure Mode | Dynamic |
| Permeability Flow Rate | 3.0 mL/min |

The results of return permeability tests for sample drilling fluid 2 including the particulate bridging agent coated with stearic acid or non-coated particulate bridging agent are provided in the table below:

TABLE 6

Return Permeability Test Results

| Test # | Particulate Bridging Agent | Initial K | Final K | % Return | Liftoff Pressure |
|---|---|---|---|---|---|
| 3 | Non-Coated | 49.0 mD | 29.0 mD | 59% | 336 psi (2317 kPa) |
| 4 | Coated | 29.0 mD | 25.7 mD | 89% | 320 psi (2206 kPa) |

As illustrated in Table 6, the return permeability was better when using the particulate bridging agent coated with stearic acid. In addition, the liftoff pressure was slightly lower with the particulate bridging agent coated with stearic acid.

Example 4

Similar return permeability tests were conducted using the coated and non-coated particulate bridging agent in a sample drilling fluid formulated as a drill-in fluid. The particulate bridging agent coated with stearic acid was prepared according to the procedure described in Example 1 and included in the following sample drilling fluid.

TABLE 7

Sample Reservoir Drilling Fluid 3

| Formulation and Order of Addition | Value |
|---|---|
| Water, bbl | 0.834 |
| CaCl$_2$ salt, lb | 152.3 |
| Viscosifier, lb | 0.75 |
| Filtration Control Additive, lb | 5 |
| Ph Buffer, lb | 3 |
| Calcium Carbonate (d50 of 5 microns), lb | 12 |
| Calcium Carbonate (d50 of 50 microns), lb | 25 |

The conditions used in the return permeability tests are summarized in the table below:

TABLE 8

Test Conditions

| Core | Bear Sandstone (~800 mD air permeability) |
|---|---|
| Temperature | 150° F. (66° C.) |
| Drilling Fluid Exposure Pressure | 200 psi (3447 kpa) |
| Drilling Fluid Exposure Time | 2 hours |
| Drilling Fluid Exposure Mode | Dynamic A 1.0 L/min |
| Permeability Flow Rate | 5.0 mL/min |

The results of return permeability tests for sample drilling fluid 3 including the particulate bridging agent coated with stearic acid or non-coated particulate bridging agent are provided in the table below:

TABLE 9

Return Permeability Test Results

| Test # | Particulate Bridging Agent | Initial K | Final K | % Return | Liftoff Pressure |
|---|---|---|---|---|---|
| 5 | Non-Coated | 845.0 mD | 470.0 mD | 56% | 15.5 (106.9 kPa) |
| 6 | Coated | 374 mD | 374 mD | 100% | 23 psi (158.6 kPa) |

As illustrated in Table 9, the return permeability was better when using the particulate bridging agent coated with stearic acid.

The preceding description provides various examples of the systems and methods of use disclosed herein which may contain different method steps and alternative combinations of components. It should be understood that, although individual examples may be discussed herein, the present disclosure covers all combinations of the disclosed examples, including, without limitation, the different component combinations, method step combinations, and properties of the system. It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, and may be modified and practiced in different but equivalent manners apparent to those skilled in the art having the benefit of the teachings herein. Although individual examples are discussed, the disclosure covers all combinations of all of the examples. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of those examples. If there is any conflict in the usages of a word or term in this specification and one or more patent(s) or other documents that may be incorporated herein by reference, the definitions that are consistent with this specification should be adopted.

What is claimed is:

1. A method for drilling a wellbore comprising:
   circulating a drilling fluid in the wellbore, wherein the drilling fluid comprises particulates treated with one or more hydrophobizing agents, wherein the one or more hydrophobizing agents comprise a fatty acid;
   extending the wellbore while the drilling fluid is circulated in the wellbore;
   forming a filter cake in the wellbore, wherein the filter cake comprises a portion of the particulates from the drilling fluid, and wherein the filter cake has a reduced liftoff pressure; and
   flowing back the wellbore to at least partially remove the filter cake with the reduced liftoff pressure, wherein the at least partial removal of the filter cake occurs in the absence of contact with one or more breakers.

2. The method of claim 1, wherein the extending the wellbore comprises extending the wellbore into a reservoir.

3. The method of claim 1, wherein the particulates comprise an inorganic particulate.

4. The method of claim 1, wherein the particulates comprise at least one particulate selected from the group consisting of calcium carbonate, magnesium carbonate, magnesium oxide, magnesium citrate, zinc carbonate, zinc oxide calcium sulfate, calcium citrate, calcium succinate, calcium tartrate, calcium maleate silica, bismuth citrate, crystalline silica, and combinations thereof.

5. The method of claim 1, wherein the particulates have a mean particle size in a point within a range of from about 1 micron to about 2,000 microns, and wherein the particulates are included in the drilling fluid in an amount of about 0.5 pounds to about 120 pounds per barrel of the drilling fluid.

6. The method of claim 1, wherein each of the particulates is at least partially coated with the one or more hydrophobizing agents.

7. The method of claim 6, wherein the one or more hydrophobizing agents coat at least 50% of an external surface area of one or more of the particulates.

8. The method of claim 1, wherein the fatty acid comprises a carbon backbone chain that comprises 10 to 30 carbon atoms.

9. The method of claim 1, wherein at least one of the particulates comprises calcium carbonate, and wherein the one or more hydrophobizing agents further comprises stearic acid.

10. The method of claim 1, wherein the drilling fluid further comprises water.

11. The method of claim 1, wherein the drilling fluid further comprises a brine comprising a dissolved divalent salt.

12. A method for drilling a wellbore comprising:
    circulating a drilling fluid in the wellbore, wherein the drilling fluid comprises a brine and carbonate particulates coated with one or more fatty acids;
    extending the wellbore while the drilling fluid is circulated in the wellbore;
    forming a filter cake in the wellbore, wherein the filter cake comprises a portion of the carbonate particulates from the drilling fluid, wherein the filter cake has a reduced liftoff pressure; and
    flowing back the wellbore to at least partially remove the filter cake, wherein the at least partial removal of the filter cake occurs in the absence of contact with one or more breakers.

13. The method of claim 12, wherein the extending the wellbore comprises extending the wellbore into a reservoir.

14. The method of claim 12, wherein the carbonate particulates have a mean particle size in a point within a range from about 1 micron to about 2,000 microns, and wherein the carbonate particulates are included in the drilling fluid in an amount of about 0.5 pounds to about 120 pounds per barrel of the drilling fluid.

15. The method of claim 12, wherein the one or more hydrophobizing agents coat at least 50% of an external surface area of one or more of the carbonate particulates, wherein the one or more fatty acids comprises a carbon backbone chain that comprises 10-30 carbon atoms, wherein the carbonate particulates comprise calcium carbonate, and wherein the brine comprises a dissolved divalent salt.

16. A method for drilling a wellbore:
- circulating a drilling fluid in the wellbore, wherein the drilling fluid comprises a divalent brine and calcium carbonate coated with stearic acid;
- extending the wellbore into a reservoir while the drilling fluid is circulated in the wellbore;
- forming a filter cake in the wellbore, wherein the filter cake comprises a portion of the calcium carbonate from the drilling fluid and wherein the filter cake has a reduced liftoff pressure; and
- flowing back the wellbore to at least partially remove the filter cake, wherein the at least partial removal of the filter cake occurs in the absence of contact with one or more breakers.

17. The method of claim 16, wherein the calcium carbonate has a mean particle size in a point within a range from about 1 micron to about 2,000 microns, and wherein the calcium carbonate is included in the drilling fluid in an amount of about 0.5 pounds to about 120 pounds per barrel of the drilling fluid.

* * * * *